United States Patent [19]

Nakamura et al.

[11] Patent Number: 5,034,130
[45] Date of Patent: Jul. 23, 1991

[54] METHOD FOR PRODUCING A COMPOSITE MEMBRANE AND THE COMPOSITE MEMBRANE

[75] Inventors: Yoshiharu Nakamura; Teruo Hori, both of Fukui; Hideki Nawa, Koriyama; Taizo Igarashi, Nishinomiya, all of Japan

[73] Assignee: Nippon Oil and Fats Co., Ltd., Tokyo, Japan

[21] Appl. No.: 420,434

[22] Filed: Oct. 12, 1989

[30] Foreign Application Priority Data

Apr. 7, 1989 [JP] Japan ................................. 1-87047

[51] Int. Cl.$^5$ ............................................. B01D 71/64
[52] U.S. Cl. ............................. 210/500.38; 210/500.4
[58] Field of Search ......................... 210/500.38, 500.4

[56] References Cited

U.S. PATENT DOCUMENTS

| 4,830,796 | 5/1989  | Pittalis et al.     | 210/500.38 X |
| 4,879,036 | 11/1989 | Pittalis et al.     | 210/500.38   |
| 4,915,839 | 4/1990  | Marinaccio et al.   | 210/500.38 X |
| 4,929,354 | 5/1990  | Mayering et al.     | 210/500.38 X |

FOREIGN PATENT DOCUMENTS

| 62-074405 | 4/1987  | Japan              | 210/500.38 |
| 63-209707 | 8/1988  | Japan              | 210/500.38 |
| 339208    | 2/1989  | Japan .            |            |
| 86/07544  | 12/1986 | World Int. Prop. O.| 210/500.38 |

Primary Examiner—Robert Spitzer
Attorney, Agent, or Firm—Browdy and Neimark

[57] ABSTRACT

The invention is a method for producing a composite membrane useful as a functional membrane which comprises mixing polyamide and polyester in a solvent to obtain a mixed solution and preparing the membrane while removing the solvent from the mixed solution under an electric field and the composite membrane obtained by the above method.

5 Claims, 2 Drawing Sheets

METHOD FOR PRODUCING A COMPOSITE MEMBRANE AND THE COMPOSITE MEMBRANE

BACKGROUND OF THE INVENTION

The present invention relates to a new method for producing a composite membrane useful as a functional membrane and the composite membrane obtained by the above method.

Conventional methods for forming functional membranes made of synthetic resin have commonly employed, a biaxial elongation method and a solvent-casting method.

SUMMARY OF THE INVENTION

An object of the present invention is to provide a new composite membrane which can not be prepared by the conventional methods. Another object of the present invention is to provide a new method for producing the composite membrane.

The inventors of the present invention carried out research for obtaining a new functional membrane. They found that a composite membrane having new function can be obtained by preparing a membrane under an electric field employing a solvent-casting method. The invention provides a method for producing a composite membrane which comprises mixing polyamide and polyester in a solvent to obtain a mixed solution and preparing the membrane while removing the solvent from the mixed solution under an electric field. The invention also provides a composite membrane of polyamide and polyester which is using the above method. The composite membrane is characterized in that polyamide and polyester are alternately oriented in micro laminates.

BRIEF EXPLANATION OF THE DRAWINGS

In FIG. 3, black circle, triangle and rectangle marks show the test results of Example 1, and white circle, triangle and rectangle marks show the test results of Comparative Example.

DETAILED DESCRIPTION OF THE INVENTION

Figure 1:
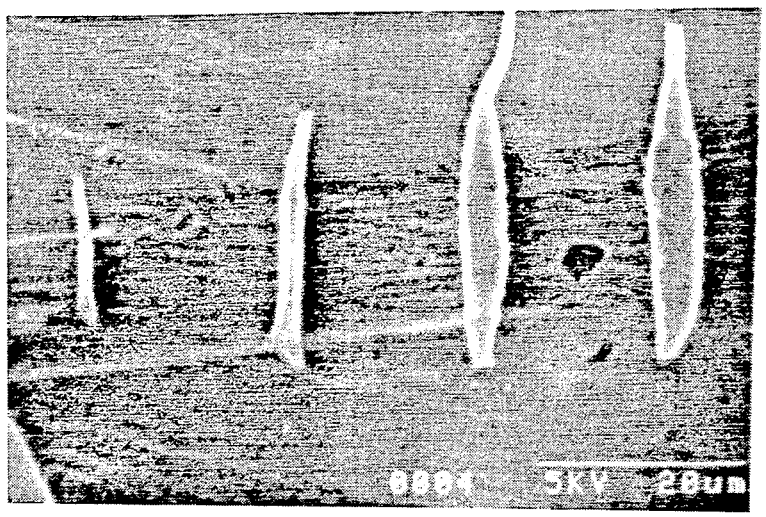
FIGS. 1 and 2 are transmission electron microphotographs of the cross sections of composite membranes obtained in Example 1 and Comparative Example.

The following description illustrates the present invention more specifically.

As mentioned above, the present invention is characterized in that a membrane is prepared while removing a solvent under an electric field. Namely, a potential of either alternating or direct current, generally direct current, is applied to the electric field. The voltage can be optionally selected, and volts of hundreds to tens of thousands are commonly used. When the voltage is lower than the above value, the orientation becomes insufficient. When the voltage is higher than the above value, undesired electric discharge is occurs.

In methods for applying a potential, there is a method in which a metal electrode, e.g. a copper electrode is set under an electrically nonconductive casting plate, e.g. a glass plate. A similar electrode is set in a space over a casting plate which is covered with a mixed polymer solution and a potential is applied between the both electrodes. Another method is one in which one of the electrodes of an electric source is earthed to prevent a discharge of high voltage and the other electrode is polarized to either positive or negative potential.

The mixed solution of polyamide and polyester is prepared by selecting a suitable solvent, preferably a solvent which can dissolve both polymers and has a low boiling point. Ketone-solvents such as acetone and methyl ethyl ketone, aromatic solvents such as benzene and toluene, and halogenated hydrocarbon solvents such as, butyl chloride, dichloropropane and trichlorotrifluoroethane can be exemplified.

The concentration of polymers contained in the casting polymer solution is arbitrarily selected. However, when the concentration is too high, the solution can not be homogeneously extended on the plate. The viscosity of the polymer solution is preferably 1,000 cps or less and the polymer concentration is 1 to 50% by weight depending on the polymer molecular weight, preferably 3 to 20% by weight.

For obtaining the desired membrane thickness of the composite membrane, it is enough to select the polymer concentration of the mixed solution and the volume of the solution to be spread over the casting plate.

After spreading the polymer solution over the casting plate, the composite membrane is prepared by removing the solvent while applying an electric field. For removing the solvent, the solvent can be allowed to evaporate as it is, or the solvent can be evaporated by carrying warm wind or under reduced pressure in a closed housing.

The polyamide which can be used in the present invention is nylon, such as nylon 6, nylon 8, nylon 11, nylon 6,6 and nylon 6,10.

The polyester which can be used in the present invention is an ester of polyhydric organic acid and polyhydric alcohol. For example an unsaturated polyester resin exemplified by polyglycol malate resin, saturated alkyd resin, etc. can be used. Glyptal resin, unsaturated alcohol denatured phthalic resin, isophthalic resin, terephthalic resin, aliphatic polyester resin, polycarbonate resin, etc. can be exemplified as the saturated alkyd resin.

The method for preparing a composite membrane of the present invention in which a solvent-casting method is used under an electric field is a new method in comparison with conventional methods. The composite membrane produced by the method of the present invention is of a new type in comparison with the membranes produced by the conventional methods.

As the embodiments of the present invention, a membrane having both hydrophobic nature and hydrophilic nature and a new type membrane for separating substances by using a pervaporation method or a reverse osmosis method can be expected.

DESCRIPTION OF PREFERRED EMBODIMENTS

The following examples illustrate the present invention more specifically.

Example 1

Nylon 6 (produced by Teijin Co. Ltd., nylon tips abbreviated as N hereinafter) and polyethyleneterephthalate (produced by Teijin Co. Ltd., polyethyleneterephthalate, a gat group, abbreviated as P hereinafter) were dissolved in 5 ml of hexafluoro-2-propanol by changing the mixing ratio of N and P to obtain 0.2 g of the total weight of N and P. The obtained solution was casted on a glass plate, the solvent was evaporated at 18° C. while 8 KV of an electric field of a direct current was applied by using the cathode of a copper net which was set at a distance of 10 cm from the surface of the glass plate and the anode under the glass plate, and composite membranes having each component ratio of N and P were prepared. Each sample of the obtained composite membranes had a membrane thickness of about 15 μm.

In Comparative Example, composite membranes having the same ratio of N and P as the above example were prepared under a nonelectric field.

The obtained membranes were stabilized by treating with hot water. The stabilized membranes were observed under a transmission electron microscope and the dye permeation was tested.

The observation under a transmission electron microscope

Figure 2:

Composite membranes having a N/P ratio of 6/4 (Example 1 of the present invention) and a N/P ratio of 6.5/3.5 (Comparative Example) are representatively selected. After the membrane was treated with osmic acid, the cross sections of the membranes were observed under a transmission electron microscope. The microphotographs of the cross section of the composite membrane obtained under the electric field in Example 1 of the present invention and the cross section of the composite membrane obtained under the nonelectric field in Comparative Example were shown in FIGS. 1 and 2.

From these Figures, it is found that the cross section of the composite membrane prepared under the electric field has micro laminates of N and P which are uniformly and alternately oriented, and the cross section of the composite membrane prepared under the nonelectric field has laminates of N and P which are oriented at random.

The test of dye permeation

The composite membrane stabilized with hot water was permeated with an Orange-II (OR-II) dye.

The membrane was set in a permeation cell of two-compartments type having two baths. After 1.0 mmol/l of an OR-II aqueous solution was charged in the one bath (I) and pure water was charged in the other bath (II), the permeation was started. By plotting the amount of OR-II which was permeated in the other bath (II) with time, the permeation coefficients $D_{app}$ were determined by the diffusion fluxs under steady states. The results are shown in FIG. 3.

Figure 3:
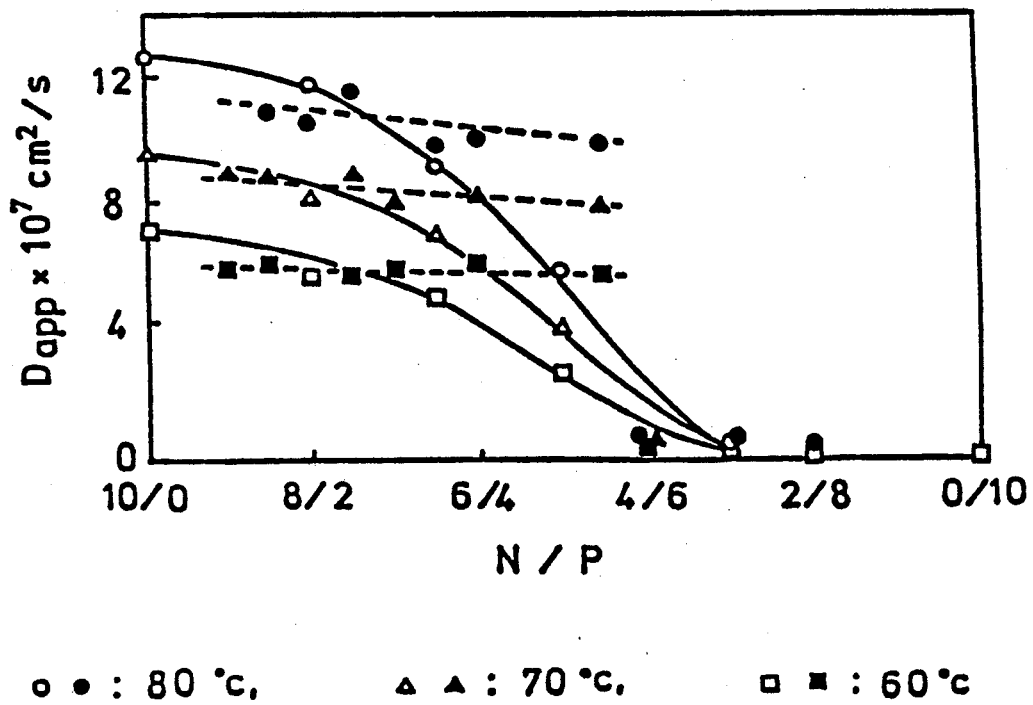
FIG. 3 shows the results of permeation measurements for dye Orange II of Example 1 of the present invention and Comparative Example.

As shown in FIG. 3, in the case of the Comparative Example in which the composite membrane prepared under the nonelectric field, $D_{app}$ steeply decreased with increasing the amount of P. The other hand, in the case of Example 1 of the present invention in which the composite membrane was prepared under the electric field, $D_{app}$ was little changed before N/P went up to 4/6.

When membranes for substance separation are used, the control of the permeation coefficients is very important. In this case, even if the ratios of compositions slightly deviate, the permeation is kept constant, so that the present invention gives important significance.

We claim:

1. A composite membrane having a polyamide and a polyester alternately oriented in micro-laminates and obtained by dissolving a polyamide and a polyester in a low boiling point solvent to obtain a mixed solution, and preparing the membrane by spreading said solution over a casting plate while removing the solvent from the mixed solution under an electric field.

2. The membrane of claim 1, wherein the polyamide is selected from nylon 6, nylon 8, nylon 11, nylon 6, 6 and nylon 6, 10; and the polyester is selected from an unsaturated polyester resin and a saturated alkyd resin.

3. The membrane of claim 2, wherein the low boiling point solvent is hexafluoro-2-propanol, the unsaturated ester is polyethylene-terephthalate and the polyamide is nylon 6.

4. The membrane of claim 3, wherein the hexafluoro-2-propanol is removed at about 18° C. and the electric field is a direct current of about 8 KV.

5. A method for producing a composite membrane which comprises mixing polyamide and polyester in a solvent to obtain a mixed solution and preparing the membrane while removing the solvent from the mixed solution under an electric field.

* * * * *